(12) United States Patent
Alasaarela (10) Patent No.: US 7,693,743 B2
(45) Date of Patent: Apr. 6, 2010

(54) METHOD AND SYSTEM FOR COLLECTING, PROCESSING AND PRESENTING EVALUATIONS

(75) Inventor: Esko Alasaarela, Oulu (FI)

(73) Assignee: ZEF Solutions Oy, Oulu (FI)

( * ) Notice: Subject to any disclaimer, the term of this patent is extended or adjusted under 35 U.S.C. 154(b) by 1653 days.

(21) Appl. No.: 10/221,681

(22) PCT Filed: Mar. 28, 2001

(86) PCT No.: PCT/FI01/00300

§ 371 (c)(1),
(2), (4) Date: Dec. 10, 2002

(87) PCT Pub. No.: WO01/75542

PCT Pub. Date: Oct. 11, 2001

(65) Prior Publication Data

US 2003/0182370 A1 Sep. 25, 2003

(30) Foreign Application Priority Data

Mar. 28, 2000 (FI) ................................. 20000715

(51) Int. Cl.
*G06F 11/34* (2006.01)
*H04M 3/51* (2006.01)
*G05B 19/418* (2006.01)
*G06F 9/46* (2006.01)
*G06F 7/00* (2006.01)

(52) U.S. Cl. ............................... 705/11; 705/10; 705/8; 707/102

(58) Field of Classification Search ..................... 705/8, 705/10; 707/102
See application file for complete search history.

(56) References Cited

U.S. PATENT DOCUMENTS 5,740,035 A * 4/1998 Cohen et al. .................. 705/10

(Continued)

FOREIGN PATENT DOCUMENTS

JP 08179883 7/1996

(Continued)

OTHER PUBLICATIONS

Stevenson, Nancy, Brian Reilly, Dave Johnson, Steve Rindsberg, Dorothy Burke, Laura Monsen, Michael O'mara, Todd White, Michael Desmond, and Edward Willett. Special Edition Using Microsoft PowerPoint 97. Que, 1996. Safari Books Online. Aug. 2, 2007 <http://proqest.safaribooksonline.com>.*

(Continued)

*Primary Examiner*—Beth V Boswell
*Assistant Examiner*—Folashade Anderson
(74) *Attorney, Agent, or Firm*—Harrington & Smith (57) ABSTRACT

The invention relates to a teamwork method and a computer system, using which the evaluations of a group about the features of different targets can be gathered and summarized. The system comprises a server (1), the workstation of the main user (3), a number of workstations for evaluators (4-7) and the software used by the web-browser. The main user formulates the inquiry. The server requests through email the evaluators to answer it. The evaluations are entered graphically using a two-dimensional table. The axes of the table present the dimensions to be evaluated. The program calculates normalization for the answers given so that the mean value is located in the origin. When a report is requested the server calculates the normalized mean-value figure, places the points in the two-dimensional table and adds ellipses around them, the dimensions of which present the deviation of the points in the direction in question.

13 Claims, 4 Drawing Sheets

U.S. PATENT DOCUMENTS

| | | | | |
|---|---|---|---|---|
| 5,926,794 | A * | 7/1999 | Fethe | 705/11 |
| 6,175,833 | B1 * | 1/2001 | West et al. | 707/102 |
| 6,757,660 | B2 * | 6/2004 | Canada et al. | 705/7 |

FOREIGN PATENT DOCUMENTS

| | | |
|---|---|---|
| WO | WO 98/04083 | 4/1998 |

OTHER PUBLICATIONS

Com Products retreived from web archives (Dec. 21, 2009) http://www.graphicsserver.com/com_products/GraphicChoiceBubble.aspx, dated Dec. 3, 2002.*

Peter Parnes, The mStar Environment—Scalable Distributed Teamwork Using IP Multicast, Sep. 1997, Division of Software Engineering, Department of Computer Science and Electrical Engineering, Lulea University of Technology.

* cited by examiner

METHOD AND SYSTEM FOR COLLECTING, PROCESSING AND PRESENTING EVALUATIONS

This patent application claims priority from Patent Application 20000715 filed on 28 Mar. 2000 in Finland.

The present invention relates to a method and a computer system applying the method in question to collect, to process and to present evaluations, views and/or opinions of a group, which is either gathered or scattered.

Collecting the evaluations, views and opinions of two or more people and processing the common evaluation, view and the expression of the opinion of a group are done usually either by getting together, by discussing and by making an oral or written report as a result. It can also be accomplished physically far from each other as a telephone, video or net meeting. In these meetings it is also possible to apply acclamation or voting by raising hands to help decision-making among those present.

The opinion of a group is often compiled using questionaries and/or interviews, which are summarized in writing. In the summary statistical methods can be used to calculate the mean and the deviation of the group.

One prior art working method is the Delfoi method, in which the opinions of the evaluation group are gathered using several iterative cycles. The summary of the temporary results is given to the group as a feedback in order to work up the opinion of the group cycle by cycle nearer to the consentaneous decision.

A parliamentary exercise of power is sometimes combined with a voting machine in the meeting place, by which the opinions of those people present can be found out about the topics under voting. Lately, opinion surveys of type: Yes/No/Cannot say, have appeared also in net services. These surveys display immediately the momentary distribution of the votes.

Most methods and auxiliary devices used today are time consuming and as such not real time. It can take even weeks to find out the results of questionary or telephone interview surveys. Even the iterative cycle of the Delfoi method takes normally several days, even weeks.

The best methods in real time are physical and/or virtual meetings and the discussions and acclamations taken place in them, but even processing of this type is time consuming and ineffective. In addition, the common opinion is greatly affected by the communication and interaction skills of those present. Talkative, emphatically acting participants distort the result when many silent experts withdraw themselves from conversation. It is so easy to influence on the attitudes of a group.

Voting machines facilitate honest opinion input also from withdrawing persons and also otherwise make the decision making process more democratic but mostly the machines are of type: Yes/No/Empty, which are suitable for a limited choice of tasks.

For rapid feedback gathering voting machines suitable for meeting hall usage have also been developed, using which the common opinion on various topics can be queried with wireless terminals, distributed to the audience.

The group feedback systems used nowadays are one-dimensional. They can be used only to check what the participants regard as important, which alternative they would choose from those presented or which vision they believe in. Especially in strategic working it is important to know the opinions two- or multidimensionally, which succeeds nowadays only when some feedback questionaries planned for surveying customer contentment are used.

The problem in many teamwork methods is also that they are bound to a certain place. If one of the key figures is on a journey, he often cannot participate in decision making at all or the schedules of the meetings have to be postponed due to journeys.

The object of this invention is to remove these shortcomings and to create such a method and system for collecting, processing and presenting evaluations, views and opinions of a gathered or scattered group, which is real time or at least is only dependent on the activity of the group members themselves, processes democratically the answers of all participants, assures anonymity, if required, is suitable for working with information networks, is multidimensional, corrects skew attitudes and is suitable for working independently of time and place, increases the mutual commitment of the group and markets itself.

The method and the computer system according to the present invention are based on collecting evaluation data two- or multidimensionally (e.g. importance/performance), based on their normalization individually for each responder so that the mean values of the points entered into the coordinate system are set to the origin and the deviation (standard deviation or another value representing the deviation) to a preset constant value, based on processing the results together so that the mean value of the answers of the group is set to the origin and the point of each feature to be evaluated is set to the mean value of normalized points and the standard deviation to the preset constant value.

Gathering the evaluation information is performed most beneficially through information network connection in which for each evaluator an input table of his own is opened, in which the features to be evaluated or other things have been listed and numbered and in which the evaluator moves with a mouse etc. the numbers in question to his own table and puts them into the location he desires. The axes of the table, which can be either two- or three-dimensional, present the dimensions to be evaluated (e.g. on the vertical axis 'importance' and on the horizontal axis 'performance'). At the other end of the axes is the weak value of the dimension and at the opposite end the strong value (e.g. low importance/high importance, bad performance/good performance).

The evaluation information can also be gathered by numerical values or on 'tick the alternative desired' principle. In this case there can be more than three dimensions. Evaluation by numbers becomes beneficial when a graphic web-browser with special features is not available or the evaluations are desired to be entered by email, facsimile, telephone or wap-connection.

In the first normalization the means and standard deviation for every dimension are calculated from the evaluator's own evaluations so that the points can be moved, if desired, to such locations that in every dimension the new means calculated from them fall on the origin. Most beneficially this happens by subtracting from every coordinate of the point received as an answer the mean of all answers having the same direction and by dividing the new coordinate value by the standard deviation of all the answers of the target in question having the same direction. The mean of the coordinates of the new points calculated with this method becomes zero in every dimension (i.e. the mean falls on the origin) and the standard deviation becomes one. Thus the points are located on the table so that they deviate in every direction with the same amount. The dimensions of a suitable square are $-1,5 \ldots +1,5$, in which case only very seldom one point falls outside the area and also those points can be restricted to the borderline of the square.

The first normalization removes the so-called skew attitude. Some think that all features evaluated are important whereas other people think they are not important. Some think everything goes badly, some other persons see both good and bad things. From the answers of both groups the positions of their evaluations can be seen in proportion to all of their own evaluations. From that e.g. the order can be found out (e.g. the order of priority or the order of quality from best to worst).

It is good for the evaluator to see his normalized pattern of points before the information is sent to the common processing so that he can correct it nearer to the pattern he desires.

When enough evaluations have been gathered or when the time allowed for the evaluation expires the calculation of the summary is performed. For each feature evaluated its location is calculated as a mean of the locations given by different evaluators. The means and standard deviations are calculated separately for every dimension. The new locations of points are normalized once more so that the common mean of all points falls again on the origin on the display table and the standard deviation common to all points falls for every dimension on the preset constant value (i.e. on the 1,5*1,5 table to one). For each evaluator a report can also be made showing in addition to the common evaluation also his own evaluation so that the evaluators can compare their own evaluation with the common evaluation of the group according to the locations of the points. The standard deviation of each location of a point (the deviation of the locations given by evaluators) can be displayed by an ellipse, angular figure or other two-dimensional figure drawn around the point (two-dimensional table) or by a corresponding three-dimensional figure (three-dimensional table). The diameter of the ellipse in both directions represents the deviation of the points (e.g. the diameter=standard deviation in the direction in question).

It is possible to see at a glance from the end result, which of the features evaluated are located in each field of the four-field (or in the cubic block defined by the coordinate planes). E.g. in the importance/performance four field the good and important features are separated from bad but important features. It can be seen from the ellipse immediately on which topics there have been an agreement and on which topics there is disagreement.

The evaluation can be done very quickly even if the evaluators are physically located around the world. It is possible to show the result to all evaluators and to other persons desired so that new stimuli are given to the discussion and it directs the thoughts in the same direction. It is also possible to repeat the evaluation immediately after the discussion. For the new evaluation the list of features to be evaluated can be changed or focused. A regular monthly or annual follow-up is also possible when the results of the evaluations are stored and they are displayed simultaneously in the same figure.

More precisely, the method according to the present invention is characterized in that what has been presented in the characteristics of the independent method claim and for the computer system in that what has been presented in the characteristics of the independent product claim.

In the following, the invention is described by an application example (named CREST in the following, CREST comes from the words CREative Strategic Thinking) referring to the accompanying figures.

Figure 1:
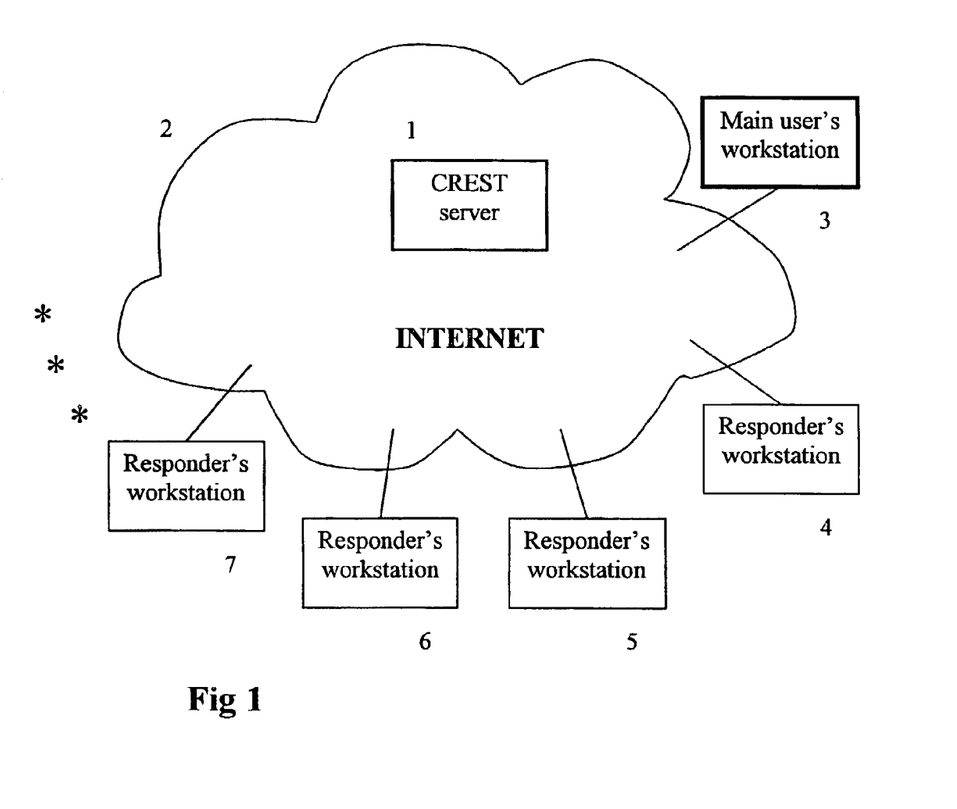
FIG. 1 shows a CREST system, which operates in the Internet.

The most important part of the information network version (FIG. 1) of the method according to the present invention (called CREST analysis in the following) is the server 1 (called CREST server in the following), which runs in the Internet 2. The software running in the server is called the CREST tool in the following. The main user acquires the right to use the CREST tool through the Internet. The work-station 3 of the main user is in contact through a web-browser with the CREST server 1. The workstations 4, 5, 6 and 7 of the evaluators are likewise in contact through the web-browser with the Internet 2. The communication between the CREST server 1, the main user and the evaluators is performed also through email in addition to web-pages.

Figure 2:
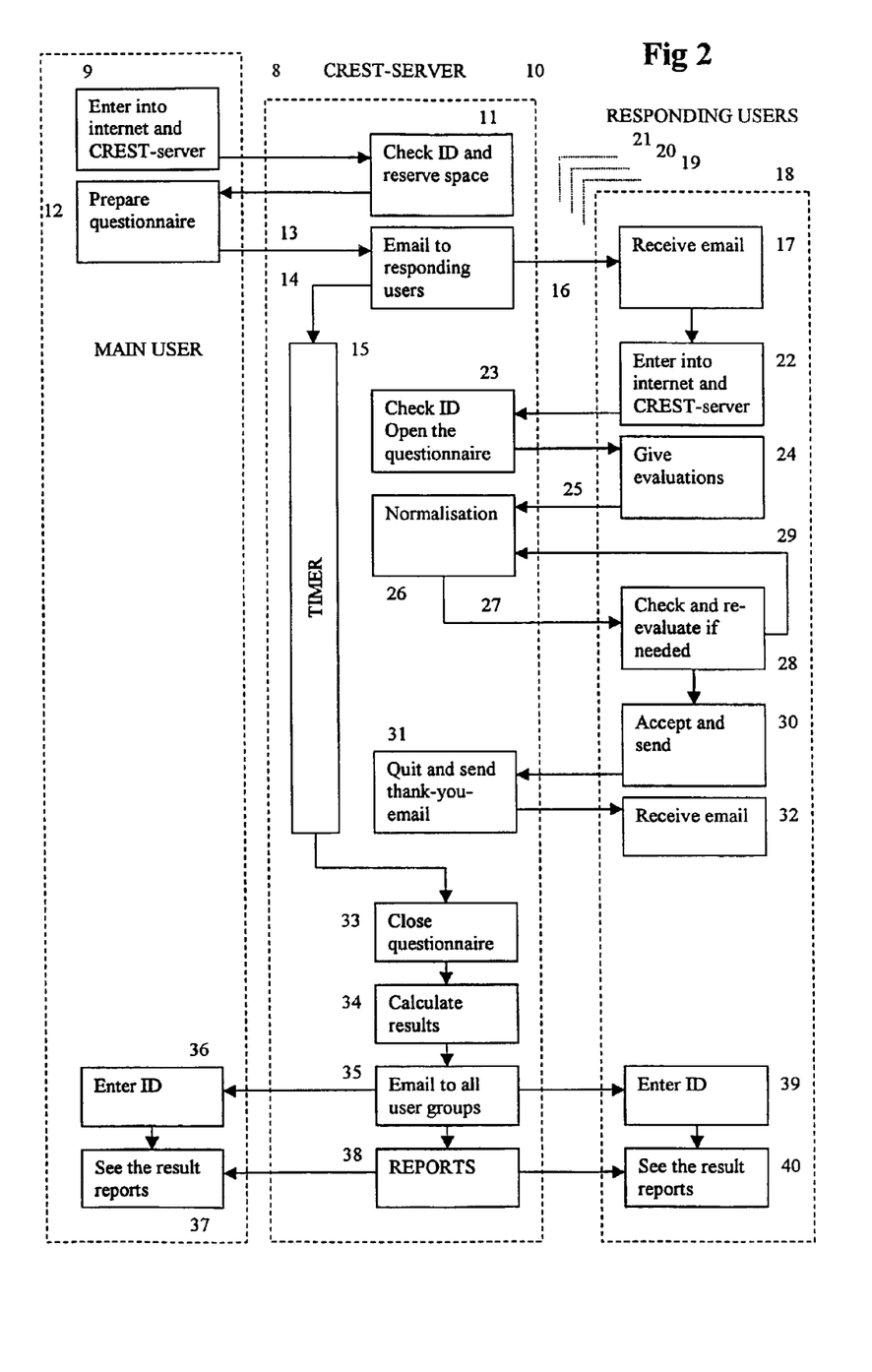
FIG. 2 shows a flowchart of the method i.e. the events in the CREST analysis.

The phases for doing a CREST analysis are presented in FIG. 2. The main user logs in with his own workstation 8 to the Internet and logs in 9 to the CREST server 10, which checks the authorization 11 and opens the CREST tool, which is shown to the main user as a workbook.

The main user prepares the questionary 12 by filling into the first table of the workbook the name of the company or the community, the specifier of the name, contact information, a short description of the inquiry for the summary table, the headings of the axes and the adjectives describing their value. He writes the basic descriptions for the blocks of the four field in the summary table and the starting and closing times of evaluation inputs. To another table he writes the targets of the evaluation (e.g. in case of a SWOT analysis 'strengths', 'weaknesses', 'opportunities' and 'threats') and possible headings, which deviate from the basic headings of the axes (in the SWOT example the basic headings can be 'importance' and 'performance', which can be used for evaluating existing conditions i.e. for strengths and weaknesses but for evaluating the future issues i.e. for opportunities the headings are changed to 'credibility' and 'attractiveness' and for threats to 'probability' and 'seriousness') and the adjectives describing their value (small—big, bad—good, insignificant—significant etc.) and in the summary table he writes the descriptions deviating from the basic descriptions of the fields of the four field (in case of the SWOT example as basic descriptions in strong point and weak point tables can be used starting from the right upper field and circulating clockwise with the sun: 'Continue this way', 'Underestimated or overestimated?', 'Forget these' and 'For heaven's sake, do something' while for the descriptions of the four field of opportunities are suitable correspondingly 'Wow!', 'Castles in the air', 'Forget these' and 'Secure') . In the third table he lists the features of the evaluation target, which should be evaluated (in the SWOT example the strengths could be: 'Technological know-how', 'Customer orientation' etc. and opportunities: 'The Far East market', 'Electronic commerce' etc.). In the fourth table he defines the evaluator groups (e.g. 'strategic team', 'production personnel', 'marketing and sales', 'customers', 'owners' etc.). In the fifth table the main user defines the evaluators in each evaluator group and their email addresses. Finally he signs 13 that the questionary is ready. Part of the information entered by the main user is delivered to the evaluators with the input table (FIG. 3) and part with the summary table (FIG. 4).

Next the CREST server according to flowchart in FIG. 2 connects 14 the inquiry to the input state for evaluations at a moment entered to the timer 15 and sends 16 by email an announcement and instructions to the evaluators. The evaluator receives 17 the inquiry message to his workstation 18. The same message is sent to all users marked as evaluators 19, 20, 21. Each evaluator logs himself in 22 according to the instructions he has received or with the help of the link and personal user identification and password to the CREST server, which checks 23 the user information and opens for the user in question the evaluation input table reserved for him. The input table can be protected, if desired, so that not even the main user can access it. The evaluator inputs 24 his evaluations (in more detail in FIG. 3) and enters a normalization command 25. The CREST server performs 26 the normalization and returns 27 the normalized input table to the evaluator display. The evaluator checks 28 the result and moves points with the mouse, if required, to new locations and gives a new normalization command 29. After he has accepted the figure he sends an acknowledgement 30 of it to the CREST server, which furthermore sends an acknowledgement ('thank-you') 32 email 31 back to the user and informs when the result can be displayed.

When the timer 15 reaches the closing time of the inquiry set by the main user, the CREST server closes 33 the inquiry, calculates the summary 34 of the results and sends a message 35 to all users and possibly to a group of other people that the CREST analysis is ready and sends instructions or a link for getting the results displayed. The main user logs himself in 36 the CREST server and gets 37 the final result 38 displayed. In the same way all evaluators write themselves into the CREST server 39 and are able to investigate the result 40.

Figure 3:
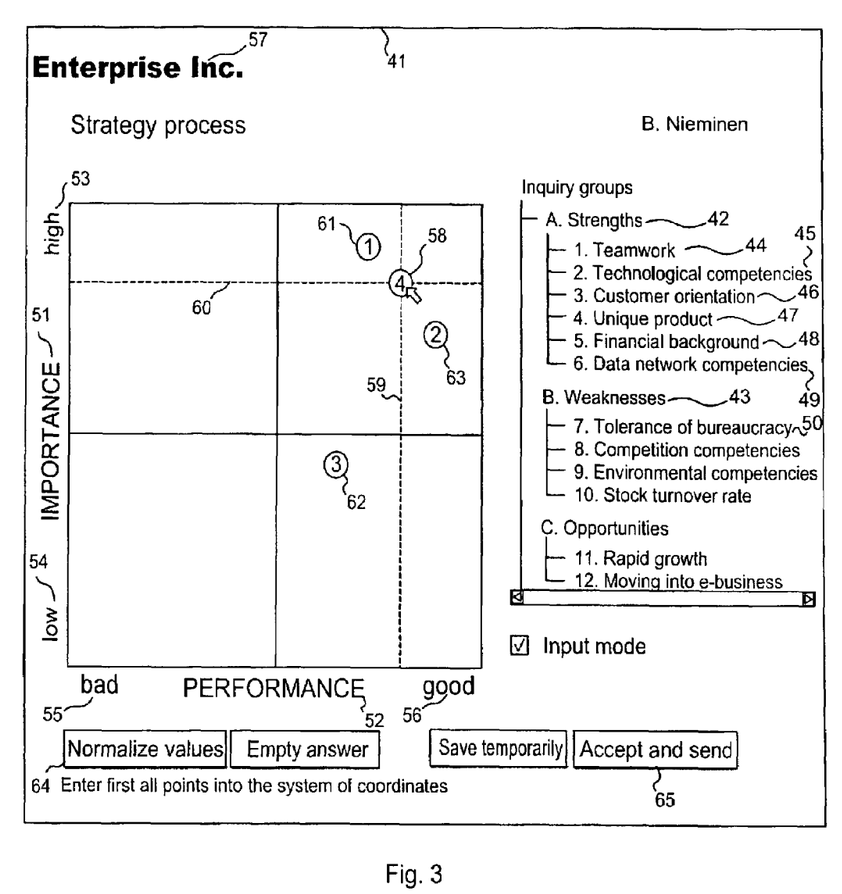
FIG. 3 shows an input table for the evaluations and its use.
Figure 4:
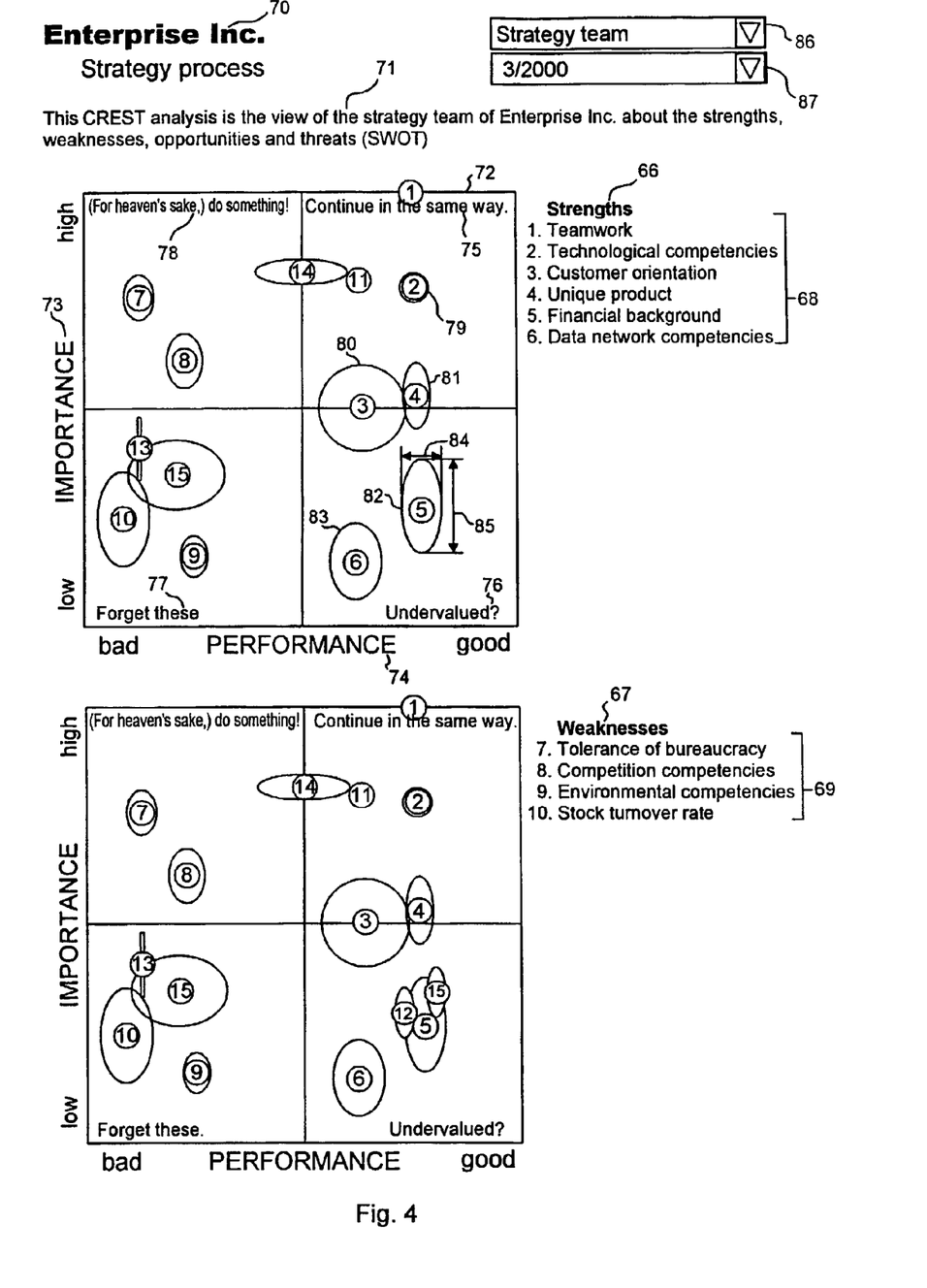
FIG. 4 shows a summary table.

FIG. 3 shows the input table 41 and its utilization in more detail. The CREST tool draws the table and locates the targets 42, 43 of evaluation into it according to the information given by the main user and the features 44, 45, 46, 47, 48, 49, 50 to be evaluated, the headings 51, 52 of the axes, the adjectives 53, 54, 55, 56 describing their value and the basic information 57 of the company or community. The evaluator activates the feature to be evaluated by clicking the mouse (In FIG. 3 feature 47 has been activated). When the cursor is moved with the mouse on the table, the number 58 of the feature in question is displayed with its vertical and horizontal cursor lines 59, 60 with the help of which and by moving the mouse the evaluator places the number in question (i.e. the feature corresponding to it) to the location he desires. The number remains in its place by clicking the mouse but it can be moved to a new location, if desired, by a new click. The values entered are shown on the table as encircled numbers 61, 62, 63. When evaluations are entered in succession the following number is activated automatically after the earlier one has been clicked into its place, which speeds up entering the evaluations. When the evaluations belonging to the same group have been entered (e.g. in SWOT the strengths and weaknesses either together or separately depending on if the same headings for the axes have been entered), the evaluator can perform normalization if he desires and can check how do the locations of the points look like after they have been normalized. (If the evaluator does not perform normalization the CREST tool performs it in any case in connection with the sending of the evaluation.) The normalization is performed by clicking with a mouse the normalization button 64. Accepting the normalization is acknowledged and the evaluation result is sent by clicking the send button 65. The anonymity of the evaluator can be secured, if desired, by denying from other users access to the input table of the evaluator in question using personal passwords for each evaluator, which are allotted by the CREST server and are only made known by email to the evaluator in question.

In the summary table (FIG. 4) the targets 66, 67 for evaluation, the features 68, 69 to be evaluated, the basic information 70 of the company, a short description 71 of the analysis and the summary four field 72 with its headings 73, 74 of axes and with the descriptions 75, 76, 77, 78 of the four fields are shown. The numbers describing features are shown in the table as mean values in their places calculated and normalized horizontally and vertically. Each point is encircled by an ellipse 79, 80, 81, 82, 83, which describes the deviation. The diameter of the ellipse horizontally 84 describes the deviation of the opinions in that direction and the vertical diameter 85 correspondingly in vertical direction. It can be seen from the summary table at a glance, which category formed by the four-field the feature in question belongs to according to the opinion of each evaluator group 86. The unanimity or the deviation of opinions can also be seen from it.

There are several different additional features, which can be utilized for implementing the method and system according to the invention. E.g. the summaries can be shown either separately for each evaluator group or also by combining different evaluator groups. Different groups and their combinations can be found behind the evaluator group button 86, the groups which the CREST tool has calculated to be displayed. Comparisons between different groups can be made by color coding and showing the results of analysis on the same summary table. The ellipse presenting the feature under discussion can be made blinking and only the ellipses under discussion from the results of the different groups can be called for, in which case directing the discussion to exactly the feature desired can be made effective.

It is possible to program also the earlier results of the analysis connected to the inquiry to be found behind the same button 86 or behind its own button 87 to enable investigating the change. An earlier CREST analysis can be included in the four-field coded with a color, in which case the change can be seen at a glance. The change can be also shown as slowly repeated animation, where the points move from the places given by the earlier analysis to the places determined by the new analysis and their ellipses can change gradually to the forms given by the new analysis. Also arrows attached to each point can be used to show the change. The direction of arrows tells the direction of the change and their length tells the magnitude of the change compared with the previous time.

The information given by the CREST analysis can also be gathered into a data base, in which case it is possible to make summary analyses of it for monitoring the operation of different fields of activities, educational branches etc. The system can produce comparison information e.g. for a unit analysing the functioning of its workplace on results reached in that branch on average over last years. The CREST analysis does not give absolute values but instead relative values very illustratively.

The CREST analysis can be made to function in three-dimensional xyz-system of coordinates when during the input phase of the input field a projected cube is used instead. The third axis z of the cube runs askew in the projection. When the points are entered its projection can be seen on each surface of the cube (at least on three surfaces which have different directions i.e. on xy-, xz- and yz-planes), in which case the movement of the mouse transfers the point e.g. on the xy-plane, the movement of the mouse with the shift button pressed down moves the point on the xz-plane and the movement of the mouse with the ALT button pressed down moves the point on the yz-plane. Naturally also a control structure can be used, which moves three-dimensionally. The summary is shown as the corresponding projection figure, which can be seen from the direction of the xz-plane by pushing the shift button and from the direction of the yz-plane by pushing the ALT button. There is available the whole selection of methods known from the CAD work and e.g. from the graphical branch for displaying the different projections.

The method is suitable to be used, in addition to Internet, in the intranet or extranet of any company or community. The information from the evaluators can be gathered partly or also completely using questionaries by email, facsimile, post etc. as far as the information received by them is coded into a format suitable for the CREST tool. Thus the number scale can be used for evaluating the different dimensions of each feature. In the same way the principle: 'tick the alternative desired', can be utilized here. It is possible to use two-, three- or multidimensional system of coordinates in these analyses. The values can be given either numerically or in the two-dimensional case graphically by a wap telephone, provided that a wap service designed for this purpose has been opened.

The method and system according to the invention are suitable also for gathering, processing and presenting opinions queried from the public.

E.g. on the feedback pages of the wep magazines there could be an inquiry of the importance and the quality of its articles free to be answered by the readers. Different web based services can include surveys of customer contentment and individuals (celebrities etc.) could collect feedback of their actions, personalities etc. In this case the prior art methods are used to prevent the same user to answer more than once to the same inquiry.

The method according to the present invention is suitable also for a product that markets itself in the Internet. An advertising banner and a link to the server, from which the evaluators interested in the system can order the license to start to apply it for their own purposes as a main user, can be included in the tables of the evaluators.

The method according to the invention is applicable also as a system of one computer to process evaluations of a group, which is meeting at the same place. In this case the evaluations can be collected using graphical terminals distributed to the group so that the targets of evaluation and the features to be evaluated are projected on screen e.g. by video projector. Then the members of the group can give their evaluations straight with their terminal equipments. The summary can be displayed immediately so the work can immediately continue effectively. The graphical terminals can use infrared radiation, radio waves or ultrasound and they can be based also on giving numerical values or on voting by pressing buttons. The wap telephone can be used as a terminal by developing a wap service for this purpose. In small meetings the evaluations can be entered into the program also in turns using the same computer.

The invention claimed is:

1. A method for accomplishing a data inquiry in a data network where an evaluation group is distributed in time or in location, the method comprising:
   providing a software application at a server that is connected to said data network for processing evaluations entered by evaluation group members through workstations regarding evaluated features of various targets of evaluation:
   a main user of the data network establishing through his workstation a connection to the software application provided at the server in order to log in to the service, said main user creating input tables to be used in collecting data, said input tables being at least two-dimensional, so that value axes of said input tables are mutually perpendicular, and that the origins of said axes are located at the center point of each input table; and said main user creating evaluation targets, including features to be fed in the input tables for evaluation;
   transmitting to the evaluation group members a message that an inquiry has been started;
   registering the evaluation group members as respondents of said inquiry;
   the evaluation group members obtaining in their workstations the input tables created by the main user;
   the evaluation group members individually evaluating each feature to be evaluated by each entering an individual evaluation comprising values about two independent variables in a desired location in an at least two-dimensional input table having two evaluation axes perpendicular to each other by utilizing graphic features of their workstations;
   after receipt of each of the individual evaluations by each of the evaluation group members:
      normalizing the values entered in the input tables of the individual evaluation by moving the entered values to change an average of the values to an origin with a preset deviation by means of the software application provided at the server;
      each of the evaluation group members accepting the normalized values; and
      recording the accepted normalized values in a database provided at the server,
   terminating a response time reserved for the inquiry;
   combining each of the accepted normalized values that are recorded in the database to create combined values;
   normalizing the combined values to create second normalized values by utilizing the software application provided at the server so that a common average of all values falls on the origin with the preset deviation;
   recording the second normalized values in a graphical sum-up table; and
   transmitting the second normalized values, recorded in the graphical sum-up table, to be available for the evaluation group members by means of said sum-up table.

2. A method according to claim 1 where the message that the inquiry has started further includes a notice that the inquiry is available to the evaluation group for a predetermined time period.

3. A method according to claim 1 wherein the first normalizing the values comprises:
   transferring linearly evaluations entered by the individual evaluation group members in the input table in a coordinate system of the input table so that a common average of the entered evaluations is transferred to the origin of the employed input table; and thereafter
   multiplying each of the transferred evaluations by such a multiplier that an obtained mean deviation of all transferred and multiplied evaluations is the preset deviation.

4. A method according to claim 3 further comprising, on the basis of the combined and first normalized values that are recorded in the database:
   calculating averages of normalized evaluations of all evaluation group members for each evaluated feature and then transferring linearly said calculated averages in sum-up table coordinates so that a common average of all normalized evaluations is transferred to the origin of the graphical sum-up table, and
   multiplying the transferred averages contained in the graphical sum-up table by such a multiplier that an obtained mean deviation of said transferred and multiplied averages is the preset deviation.

5. A method according to claim 4 further comprising drawing ellipses such that the second normalized averages contained in the graphical sum-up table are center points of the ellipses and where lengths of main axes of the ellipses are proportional to the mean deviation of the normalized evaluations of the individual evaluation group members in their individual input tables in the directions of the value axes of the inquiry table.

6. A method according to claim 4 wherein the multiplier is chosen to be a number which renders 1.5 as a mean deviation.

7. A method according to claim 1 where in the case of a two-dimensional input table, the chosen evaluation target is one of the following evaluation pairs: strengths and weaknesses; possibilities and threats.

8. A method according to claim 1 where in the case that the input table is only a two-dimensional, a chosen headline for the value axes is one of the following headline pairs: importance and performance; credibility and attractiveness; probability and stability.

9. A method according to claim 1 wherein the entered values of features of each evaluation target are measured on more than two mutually perpendicular evaluation axes, and a graphic presentation of the graphical sum-up table is based on two-dimensional projection images parallel to planes created by chosen evaluation axle pairs.

10. A system for enabling real-time data inquiry, processing and output operations for an evaluation group that is distributed in time or in location and capable of establishing a connection with a data network, said system comprising:
   workstations of members of the evaluation group, said workstations being connected to the data network;
   a server connected to the data network;
   means for establishing a data transmission connection between a software application provided at the server and a workstation of an evaluation group member;
   software applications provided at the server for creating and using inquiry tables and output tables, which inquiry and output tables are used for collecting evaluations of the evaluation group members as regards features of various evaluation targets, for modifying said evaluations and compiling sum-ups, where the software applications provided at the server are configured to perform the following functions in real-time:
      to collect values of individual evaluations from each of the individual members of the evaluation group to individual input tables that are at least two-dimensional having two evaluation axes perpendicular to each other and in which input table two independent variables are configured to be evaluated by one evaluation input;
      to carry out a first normalization of the values of the evaluations entered by an individual evaluation group members in their individual input tables by moving the entered values to change an average of the values to an origin with a preset deviation;
      to record said first normalized values in a database provided at the server;
      to combine the first normalized values from the evaluations from the individual evaluation group members that are recorded in the database after a predetermined time window is closed and to second normalize said combined values by moving the combined values so that a common average of all values falls on the origin with the preset deviation, and to create, of said combined values, a graphical sum-up table that is at least two-dimensional; and
      to draw ellipses where the second normalized common averages contained in the sum-up table are the center points of the ellipses and where lengths of main axes of said ellipses are proportional to a mean deviation of the second normalized common averages of the values of the evaluations from individual evaluation group members in their individual input tables in the directions of the value axes of the inquiry table.

11. The system according to claim 10 wherein the software applications provided at the server are also configured, at least in two-dimensional output tables, to present simultaneously and distinguished with a color coding both first normalized values of the evaluations entered by a single evaluator an individual evaluation group member and respective second normalized common averages calculated from the results of all of the evaluation group members.

12. The system according to claim 10 which is configured to present the evaluations of two or more evaluation groups in, the at least two-dimensional graphical sum-up table, where the evaluations are observed simultaneously.

13. The system according to claim 10 wherein the server belonging to the system is configured to record sum-up reports compiled of the at least two-dimensional graphical sum-up tables in order to make comparisons about reports recorded in different times.

* * * * *

UNITED STATES PATENT AND TRADEMARK OFFICE
CERTIFICATE OF CORRECTION

PATENT NO. : 7,693,743 B2  Page 1 of 1
APPLICATION NO. : 10/221681
DATED : April 6, 2010
INVENTOR(S) : Alasaarela It is certified that error appears in the above-identified patent and that said Letters Patent is hereby corrected as shown below:

Claim 11, col. 10, line 29 delete "a single evaluator".

Signed and Sealed this

Twenty-fifth Day of May, 2010

David J. Kappos
*Director of the United States Patent and Trademark Office*